Patented Sept. 30, 1947

2,428,178

UNITED STATES PATENT OFFICE 2,428,178

METHOD OF MAKING FINELY DIVIDED VOLATILIZED SILICA

Richard Reik, Piedmont, and Alva C. Byrns, Los Altos, Calif., assignors to The Permanente Metals Corporation, Oakland, Calif., a corporation of Delaware No Drawing. Application July 18, 1944, Serial No. 545,551

6 Claims. (Cl. 23—182)

This invention relates to finely divided amorphous silicon dioxide that is in a condition of unusually high reactivity. This special kind of silica which shows valuable properties in a great number of various applications is particularly suited for use in the manufacture of refractory materials.

It is amongst the principal objects of the invention to prepare silica of an extraordinary degree of fineness without having recourse to mechanical trituration that requires special intensity or costly separation treatments to yield a material anything similar to the silica resulting as a primary product from the present process. Another essential object of the invention is to enable amorphous silica to be produced from naturally occurring crystalline siliceous material. Both these purposes are accomplished according to the present invention, without working cost being exceeded that are bearable in the manufacture of a raw material which is intended for use in quantities like silica. To this end ordinary sorts of silica are caused to react with reducing agents at the relatively low temperature at which reduction to gaseous silicon monoxide occurs, while continuously removing the SiO-gas from the reducing zone and subjecting it to oxidizing conditions to reform solid SiO2 therefrom which is then separated and collected. The dioxide appears in this manner in an extremely fine state of subdivision.

As early as in 1897 it has been discovered that when fireclay is heated in the presence of carbon, part of the silica is reduced and volatilized, some of the alkalis in the clay being volatilized at the same time; subsequently the supposition was made that volatilization occurs under oxidizing conditions. No industrial application resulted from these observations until in 1912 the British Thomson-Houston Co. disclosed a method of producing refractory materials by highly heating mixtures of silica and carbon that contain a metallic compound intended to yield the respective metal by reduction, and by collecting the "sublimate." A treatment of such kind of a mixture of silica, carbon and an aluminum silicate, with or without one part of manganese oxide, is reported to result in a felted material of low thermal conductivity. A similar process consists in heating a mixture of silica, carbon and rutile in an electric furnace under reducing conditions and collecting the sublimate of flaky, laminated structure that contains silicon, carbon, titanium and oxygen (British specifications Nos. 25,370, 1912, and 29,389, 1912). Out of these disclosures the assumption slipped into the technical literature that silica is "volatile" in the presence of carbon at temperatures below 1600° C. by being reduced to silicon from which silica is again formed by reoxidation (A. B. Searle, Refractory Materials, London, 1940, pp. 57/58 and 704). Seeing that the boiling point of silica is at 2230° C. and silicon boils even at 2600° C., the principle underlying the above described empirical methods remained unexplained.

On the other hand it has been assumed for a long time that, analogously to the oxides of carbon, silicon forms in addition to silicon dioxide a lower degree of oxidation of the formla SiO.

According to the U. S. Patent No. 875,286 to H. N. Potter, SiO is obtained by heating crystalline silicon in the presence of oxygen under such conditions of oxygen supply and pressure as to prevent the oxidation from progressing to the stage of dioxide. For rendering the atmosphere in which heating takes place adequately poor in oxygen, Potter suggests to operate under reduced pressure or while diluting the normal atmosphere with large quantities of an inert gas.

Alternatively it has been proposed to prepare SiO by partial reduction of SiO2, for which purpose different ways have been chosen.

The first experiments were made in 1887 with fused silica while using carbon as the reducing agent (American Chem. Journ., vol. 9, pp. 14/15). In 1904 Potter succeeded in performing the carbothermic reduction without a melt by simply heating a mixture of SiO2 and an amount of carbon that corresponds to the reaction

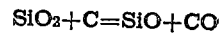
$$SiO_2 + C = SiO + CO$$

to a temperature at which the monoxide volatilizes. Another investigator, Frank G. Tone, disclosed in the U. S. patent No. 993,913 a similar method of partial reduction of SiO2 by means of carbon, while leaving the question undecided whether the product obtained by condensation from the gaseous products of combustion leaving the reduction furnace, was a lower oxide of silicon or a mixture of silica and amorphous silicon. According to Tone the silica to carbon ratio in the furnace feed may conform to the reaction

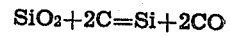
$$SiO_2 + 2C = Si + 2CO$$

or be even lower in silica and higher in carbon, respectively; but Tone adds that it is much better to employ mixtures higher in silica since such mixtures yield the desired product in greater abundance.

A second method, proposed by Potter in his specification No. 875,675, consists in performing the partial reduction of $SiO_2$ with the aid of silicon according to the equation $$SiO_2 + Si = 2SiO$$

for instance by heating an approximately composed mixture of Si and $SiO_2$ above the resistor of an electric furnace of the arc type in an indifferent atmosphere.

Finally according to R. Flusin (Ind. chimique 9, 391) silicon carbide may be used instead of carbon for the reduction by means of the reaction $$SiO_2 + SiC = SiO + Si + CO$$

Of whatever kind the reducing agent may be, the silicon monoxide is liberated in the state of brown-colored vapors which have to be condensed quickly because otherwise decomposition takes place according to the equation $2SiO = SiO_2 + Si$ (Ullmann, Enzyklopaedie der technischen Chemie, 2nd ed., 1932, vol. 9, p. 505). The silicon monoxide depositing on condensation is reported to be in the form of an extremely finely divided powder or to appear at least principally in that form while a smaller portion is in the vitreous state.

Powders of such kind are meant for use as body for oil paints and for thermal and electrical insulation purposes, moreover as abrasive or polishing powders (Ullmann, loc. cit.). Frank G. Tone mentions in the first place the use of his products as reducing agents.

Apart therefrom, Potter suggests to utilize the finely subdivided silicon monoxide powder resulting from partial reduction of $SiO_2$ for converting it into silicon dioxide of equal fineness by oxidation. Potter states that there are various ways of doing this, one of which consists in blowing a dust of silicon monoxide through a heated chamber in which it is oxidized by reaction with an oxidizing gas (specification No. 886,637). A second method consists in blowing an oxidizing gas through a furnace during the progress of reaction which, per se, would liberate silicon monoxide (specification No. 875,674). Still another method, that is disclosed in specification No. 908,131 consists in burning the powder of silicon monoxide in the state of suspension in an oxidizing atmosphere. All these processes by which the brown monoxide powder is changed into the white dioxide have been devised according to specification No. 908,131, lines 21 to 26, for the purpose of altering the color of the primary product which, although in itself attractive and perfectly adapting the powder to certain uses, might be less serviceable for other uses. The change of color to white is stated particularly to remove any objection which may exist to the use of the material as a tooth powder or as an ingredient of many other light colored powders such as face powder for which purpose both the brown monoxide powder and the white dioxide powder are reported to be easily available by reason of their extreme fineness, non-poisonous nature and good spreading qualities (specification No. 908,131, lines 35 to 44).

When the industrial methods suggested by the British Thomson-Houston Co. are considered in the light of the discoveries made subsequently by Potter and others in connection with the formation of silicon monoxide, it may become obvious that it is not the silicon which is readily volatile in the presence of carbon and then reforms $SiO_2$ under oxidizing conditions, but that there occurs a partial reduction of silicon dioxide to silicon monoxide which is disengaged as a gas at temperatures far below the boiling point of silicon, and readily reforms $SiO_2$ on contact with air. However, this sequence of reactions was heretofore turned to account only for the production of cosmetics such as dentifrice and face powder because of yielding a finely divided powder of white color. Thereby it did not come to light that silicon dioxide directly produced by the way of gaseous SiO without intermediately isolating solid SiO by condensation shows the character and function of a chemical of extremely high reactivity that is particularly valuable for the manufacture of refractory materials; nor was it recognized that this method offers the possibility of preparing amorphous silica from naturally occurring crystalline raw materials without oppressive rise of the manufacturing expenses.

The development of these discoveries of more general import may have been impeded by the fact that it was an open question whether the product resulting from the partial reduction of $SiO_2$ and subsequent oxidation of the vapor evolved was actually a distinct substance of the formula SiO or rather a mixture of silica and silicon showing the composition of SiO. As already pointed out, Frank G. Tone left this question undecided in 1907; this was still the state of the matter in 1941, though K. F. Bonhoeffer had in the meantime succeeded in establishing, by examining the absorption spectra, that in the products formed by reduction of silicon dioxide with carbon actually the compound SiO is existent in the gaseous state (Zeitschrift fuer physikalische Chemie, vol. 131/132, 1927 to 1928, p. 363). Zintl reports in 1940 (Zeitschrift fuer anorganische und allegemeine Chemie, 245, 1 to 7) that quick condensation of the vapor evolved in the vapor space results in the formation of an exceedingly light, finely divided powder, but adds that the question whether the said powder consists of the chemical individual SiO or a mixture of Si and $SiO_2$ in correspondent proportions could not have been decided until then. Likewise, H. N. Baumann stated in 1941 in Transactions of the Electrochemical Society, vol. 80, 95, 1941, that the existence of silicon monoxide has been reported at different times, but it has remained doubtful whether this suboxide is a definite compound. Now, with regard to all the industrial purposes to which the condensation product had previously been appointed, it matters little whether the product consists of a unitary compound or of a mixture. Yet, in full contrast thereto it is prerequisite to the present process that it is the compound SiO which is being formed, and even exclusively formed, because only this compound passes over to substantially pure $SiO_2$ comprising a considerable proportion of particle sizes within, or approaching to, colloidal ranges when being subjected to oxidizing conditions in the vapor state.

In carrying out the reduction according to the present invention the SiO gas evolved is removed from the heated system, preferably drawn off by suction, so to speak in the instant of its formation. Thereby the gas disengaged is protected from decomposition according to the equation $SiO = SiO_2 + Si$, and the equilibrium associated with the reaction is steadily displaced in the favor of SiO-formation. Reoxidation is then preferably effected by injecting a stream of oxidizing gas, such as air, into the SiO gas at the point of its leaving the heated system.

Alternatively a stream of inert gas may be used for continuously conducting away the SiO gas as soon as it forms from the reduction zone instead of or while concurrently operating under reduced pressure.

Amongst the reducing agents heretofore used in the service of silicon monoxide preparation, silicon is obviously best suited for the purpose because the reaction $$SiO_2 + Si = 2SiO$$

yields silicon monoxide as the only gaseous product. Nevertheless in this case also it is a sine qua non for successful tonnage production of very finely divided amorphous and relatively pure $SiO_2$ that the monoxide is taken off from the reduction zone as soon as it is formed on purpose to minimize its decomposition to Si and $SiO_2$. The silicon is preferably employed in the form of ferrosilicon as it is the customary practice with silicon reduction. This makes the method, however, rather expensive.

If, on the other hand, the reduction is effected by means of carbon this means not only saving cost, but also offers the valuable advantage that the reduction takes place at lower temperatures (between 1250° C. and 1450° C. under reduced pressure). Yet, the situation is complicated by the fact that a gaseous mixture issues from the reducing zone which carries equal volumes of silicon monoxide and carbon monoxide gas according to the equation $SiO_2 + C = SiO + CO$. Seeing that in the said mixture of reduction products CO reacts with SiO to reconvert it partly into $SiO_2$ with the deposition of carbon, the reversion reaction has necessarily to be suppressed in order to enable silicon dioxide as free as possible from carbon to be recovered as the final product. To this end the reduction products are kept up to the very point of their issuing from the furnace at or closely below reduction temperature. By the injection of a great volume of oxidizing gas, particularly air, into the mixture of SiO and CO as it leaves the furnace, the SiO is converted into solid finely divided $SiO_2$ which is collected, whereas $CO_2$ escapes in the gaseous state.

The operation may be conducted in a furnace or retort of any desired type as a batch method or carried out continuously; it is, however, a particular advantage of the method that it offers the possibility of being readily put to practice in a continuous manner. To this end finely divided silica may be made into compacted bodies, pellets or briquettes, with the addition of an amount of reducing agent which only slightly exceeds the proportion theoretically required for partial reduction to SiO, that is a ratio of one mole silicon dioxide to one mole reducing agent. In the case of carbothermic reduction a carbonaceous binding material such as tar or pitch may be added in such amounts that, on preheating the compacted bodies before the beginning of the actual reducing operation, a porous coke skeleton is left behind which firmly binds the silica and coke particles into a coherent mass and nevertheless allows the gas evolved freely to escape. Each of these compacted bodies preferably embraces just the amount of reducing agent sufficient for partial reduction and contains besides a quantity of tar or pitch that is equal to about eight to twelve per cent of the total weight of the silica and carbonaceous reducing agent. The compacted bodies are fed in the furnace either in continuous or intermittent succession.

The solid $SiO_2$ is caused to separate and collected by any desired means, for example in a bag house or by electrical precipitation, or otherwise.

The variety of uses is great.

The silica resulting from the process according to the invention is suitable for every purpose to which it is adapted by its physical properties, viz., voluminous and intangibly soft nature and large surface extension. Such purposes are for instance the uses as a base in pigments, printing inks, paints, enamels, lakes, cleaning and polishing powders and preparations for fine surfaces, lubricants, cosmetics, and as a filler in rubber products, linoleum and so forth; moreover, the use as a carrier for specifically effective substances, such as catalysts or insecticidal, fungicidal, bactericidal substances; finally as an absorbent.

On the other hand this special kind of silica is surprisingly adapted for any application where its outstanding chemical reactivity, taken in conjunction with its other properties, can be turned to profit. A typical example is the use in the manufacture of refractory material. To serve such purposes the silicon dioxide formed, separated and collected according to the invention is mixed with a component of amphoteric or basic nature (or a plurality of such components if necessary), whereupon the mixture is shaped, or tempered and shaped, and eventually kiln-fired if desired. Even if firing is the final step of the procedure, the reduction of the primary $SiO_2$ with the use of carbon as reducing agent ought to be brought about under conditions controlled to suppress the deposition of carbon as a consequence of the back reaction between SiO and CO as far as possible; in this case also this precautionary measure is indispensable because the carbon would give rise to the formation of SiO gas during the firing operation.

Still another application of the silica resulting in a finely divided state as the original product of the process according to the present invention, will be found in the use of said silica for the production of magnesia ceramics. To this end the material recovered from gaseous SiO by oxidation and subsequent separation is blended with a preponderant amount of a finely divided magnesia and the mixture thus produced formed and fired. The fired material may be reground, if desired, and then again shaped and fired.

We claim:

1. In the production of finely divided amorphous silica by that process which comprises subjecting a siliceous material in a reducing zone to the action of a reducing agent at a temperature sufficient to cause reduction of the siliceous material to silicon monoxide and to produce gaseous silicon monoxide, and oxidizing the silicon monoxide to silicon dioxide, the improvement which comprises withdrawing gaseous silicon monoxide from the reducing zone and subjecting the silicon monoxide to oxidation while maintaining the said monoxide substantially entirely in the gaseous state.

2. In the production of finely divided amorphous silica by that process which comprises subjecting a siliceous material in a reducing zone to the action of a reducing agent at a temperature sufficient to cause reduction of the siliceous material to silicon monoxide and to produce gaseous silicon monoxide, and oxidizing the silicon monoxide to silicon dioxide, the improvement which comprises reacting the siliceous material with a carbonaceous reducing agent, wtihdrawing gaseous products of reduction including silicon monoxide from the reducing zone and subjecting the silicon monoxide to oxidation while maintaining said monoxide substantially entirely in the gaseous state.

3. In the production of finely divided amorphous silica by that process which comprises subjecting a siliceous material in a reducing zone to the action of a reducing agent at a temperature sufficient to cause the reduction of the siliceous material to silicon monoxide and to produce gaseous silicon monoxide, and oxidizing the silicon monoxide to silicon dioxide, the improvement which comprises reacting the siliceous material with silicon reducing agent, withdrawing gaseous silicon monoxide from the reducing zone and subjecting the silicon monoxide to oxidation while maintaining the said monoxide substantially entirely in the gaseous state.

4. In the production of finely divided amorphous silica by that process which comprises subjecting a siliceous material in a reducing zone to the action of a reducing agent at a temperature sufficient to cause the reduction of the siliceous material to silicon monoxide and to produce gaseous silicon monoxide, and oxidizing the silicon monoxide to silicon dioxide, the improvement which comprises withdrawing gaseous silicon monoxide from the reducing zone under reduced pressure, and subjecting the silicon monoxide to oxidation while maintaining the said monoxide substantially entirely in the gaseous state.

5. In the production of finely divided amorphous silica by that process which comprises subjecting a siliceous material in a reducing furnace to the action of a carbonaceous reducing agent at a temperature sufficient to cause reduction of siliceous material to silicon monoxide and to produce gaseous silicon monoxide, and oxidizing the silicon monoxide to silicon dioxide, the improvement which comprises withdrawing the gaseous reduction products including silicon monoxide from the reduction furnace while maintaining said products at approximately reduction temperature up to the point of issuing from the reduction furnace, and subjecting the withdrawn gaseous products of reduction to oxidation by an oxidizing gas while maintaining the silicon monoxide component thereof substantially entirely in the gaseous state.

6. In the production of finely divided amorphous silica by that process which comprises subjecting a siliceous material in a reducing zone to the action of a carbonaceous reducing agent at a temperature sufficient to cause reduction of the siliceous material to silicon monoxide and to produce a mixture of gaseous silicon monoxide and carbon monoxide, the improvement which comprises continuously withdrawing said gas mixture from the reduction zone while maintaining the said gas mixture at a temperature high enough to minimize the back reaction between SiO and CO, and subjecting the said gas mixture to oxidation while maintaining the silicon monoxide in the gaseous state.

RICHARD REIK.
ALVA C. BYRNS.

REFERENCES CITED

The following references are of record in the file of this patent:

UNITED STATES PATENTS

| Number | Name | Date |
| --- | --- | --- |
| 1,104,384 | Potter | July 21, 1914 |
| 908,131 | Potter | Dec. 29, 1908 |
| 886,637 | Potter | May 5, 1908 |
| 875,674 | Potter | Dec. 31, 1907 |
| 875,675 | Potter | Dec. 31, 1907 |
| 886,636 | Potter | May 5, 1908 |
| 2,095,982 | Heany | Oct. 19, 1937 |
| 2,313,746 | Heany | Mar. 16, 1943 |
| 2,206,131 | Seil | July 2, 1940 |
| 2,358,107 | Seil | Sept. 12, 1944 |
| 2,292,644 | Lee | Aug. 11, 1942 |
| 2,308,092 | McDougal et al. | Jan. 12, 1943 |
| 2,272,346 | McDougal et al. | Feb. 10, 1942 |